No. 11,895. Reissued Mar. 5, 1901.

E. WALKER.

CIGAR TIP CUTTER.

(Application filed Jan. 7, 1901.)

2 Sheets—Sheet 1.

Witnesses
H. W. Sturgeon.
F. J. Barbitt

Inventor
Edwin Walker
By J. H. Sturgeon
Atty.

No. 11,895. Reissued Mar. 5, 1901.

E. WALKER.

CIGAR TIP CUTTER.

(Application filed Jan. 7, 1901.)

2 Sheets—Sheet 2

Witnesses
A. M. Sturgeon.
F. J. Babette

Inventor
Edwin Walker.
By A. Sturgeon
Atty.

UNITED STATES PATENT OFFICE.

EDWIN WALKER, OF ERIE, PENNSYLVANIA.

CIGAR-TIP CUTTER.

SPECIFICATION forming part of Reissued Letters Patent No. 11,895, dated March 5, 1901.

Original No. 621,185, dated March 14, 1899. Application for reissue filed January 7, 1901. Serial No. 42,446.

*To all whom it may concern:*

Be it known that I, EDWIN WALKER, a citizen of the United States, residing at the city of Erie, in the county of Erie and State of Pennsylvania, have invented certain new and useful Improvements in Cigar-Tip Cutters; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in cigar-tip cutters; and it consists particularly in the improvements in tripping and stop mechanism thereof whereby the rotary cylinder is started and stopped.

The object of this invention is to produce a tripping mechanism that will operate to release the stop mechanism from engagement with the rotary cylinder and meanwhile not interfere with the stop mechanism again automatically engaging the rotary cylinder. This is accomplished by pivoting a stop-mechanism-tripping arm to the tripping-lever in such a manner that it will engage the rotary-cylinder stop mechanism during the downward movement of the tripping-lever and disengage said stop mechanism from the rotary cylinder, and immediately after the stop mechanism has been so disengaged this stop-tripping arm will become disengaged from the stop mechanism, so as to permit the stop mechanism to automatically operate to stop the rotary cylinder after it has rotated the distance required to cut off the cigar-tip. The mechanism I have devised to accomplish this result and its operation is hereinafter fully set forth and described, and illustrated in the accompanying drawings, in which—

Figure 1:
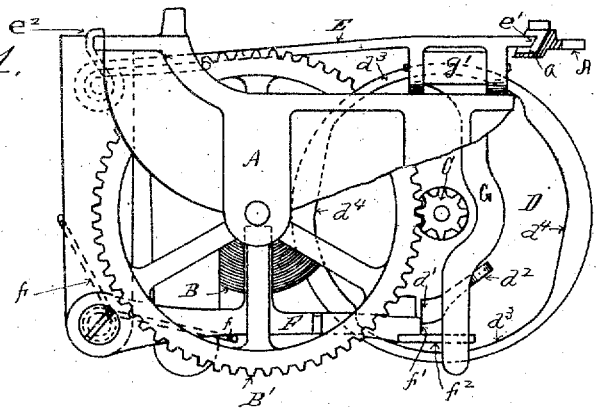
Figure 2:
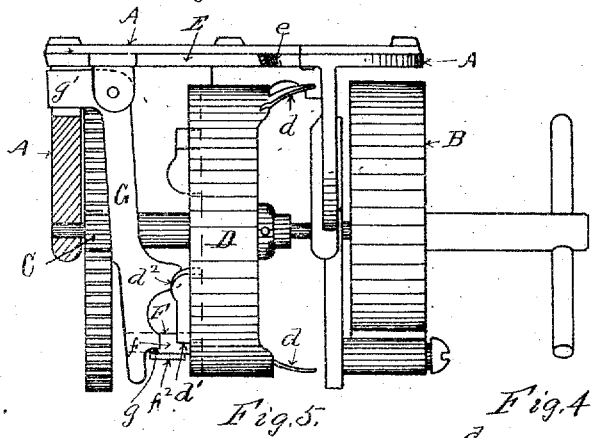
Figure 3:
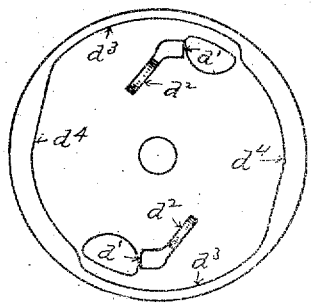
Figure 5:
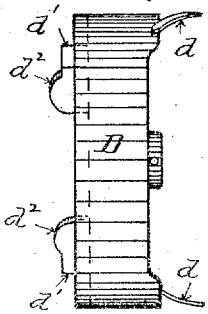
Figure 4:
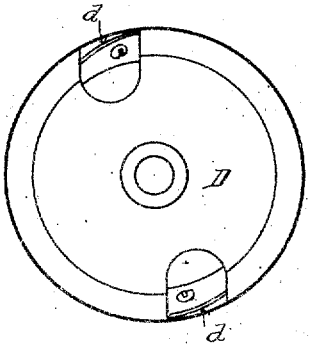
Figure 6:
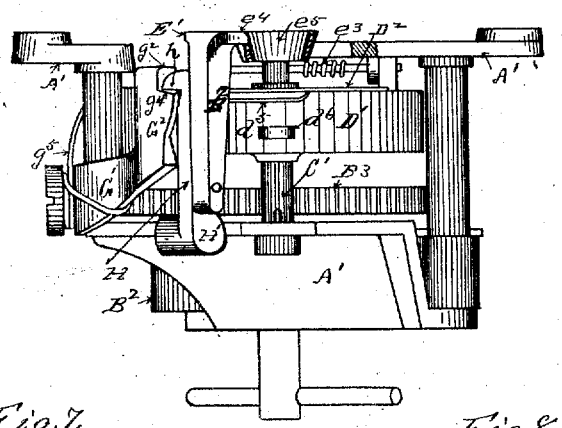
Figure 7:
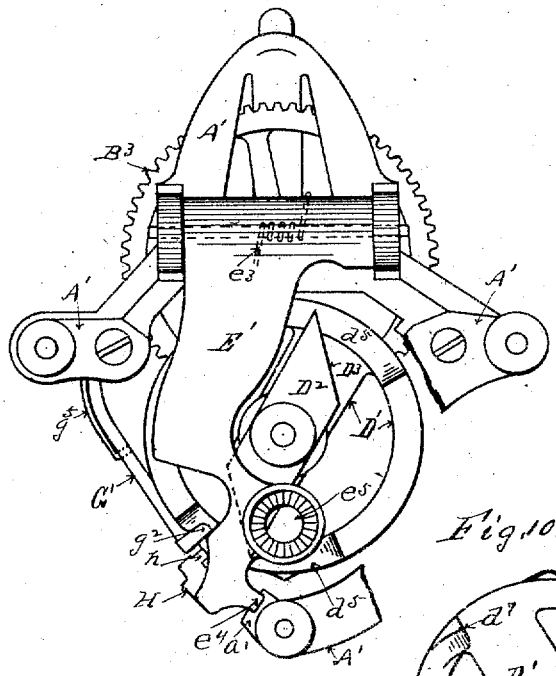
Figure 8:
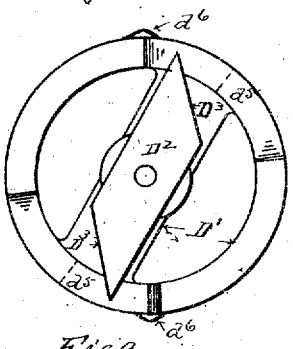
Figure 9:
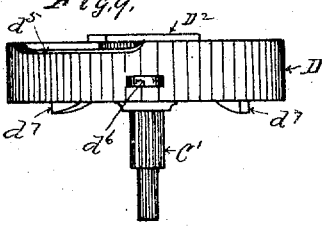
Figure 10:
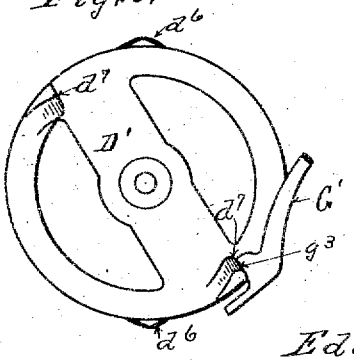

Figure 1 is a side view in elevation of a cigar-tip cutter embodying my invention with a portion of the frame broken away. Fig. 2 is a front view in elevation of the same with a portion of the frame broken away. Fig. 3 is a side view in elevation of the rotary cylinder, showing the cams and stops thereon. Fig. 4 is a side view in elevation of the opposite side of the rotary cylinder, showing the manner of securing the blades thereon. Fig. 5 is a front view in elevation of the rotary cylinder, showing the blades and stops thereon. Fig. 6 is a front view in elevation of a modified construction of my invention with a portion of the frame broken away. Fig. 7 is a top or plan view of the same. Fig. 8 is a top or plan view of the rotary cylinder and blades thereon. Fig. 9 is a side view in elevation of the same. Fig. 10 is a view of the under surface of the rotary cylinder, showing the stop-lugs thereon and a section of the stop-lever in engagement therewith.

In Figs. 1, 2, 3, 4, and 5 of the drawings thus illustrating my invention the framework A and the spiral spring B, driving a gear-wheel B′, intermeshing with and driving the pinion C on the shaft of the rotary cylinder D, are constructed and operate in the usual manner. The rotary cylinder D in this construction has projecting from one side of its periphery blades $d$ $d$, which have inclined cutting edges, and on the other side of said cylinder D there are stop-lugs $d'$ $d'$, and extending rearwardly from said stop-lugs $d'$ $d'$ there are cam-surfaces $d^2$ $d^2$, and around the periphery of the rotary cylinder D there is preferably an annular flange $d^3$, having internal cam-surfaces $d^4$ $d^4$ thereon, as and for the purpose hereinafter set forth. At the rear of the upper part of the machine-frame A there is pivoted a tripping-lever E, which extends forward over the rotary cylinder D, where it is provided with a cigar-tip opening $e$ and also with an extension $e'$, adapted to engage a depression $a$ in the top of the frame A, which operates to limit the downward movement of the tripping-lever E. This tripping-lever E is also provided with a retracting-spring $e^2$, (shown in dotted lines in Fig. 1,) which operates to raise and normally retain the front end of the tripping-lever above the rotary cylinder D, but permits it to be depressed toward the cylinder by pressing downward thereon, and when the pressure thereon is removed the spring $e^2$ automatically returns the tripping-lever E to its normal position. At the rear of the lower part of the frame A there is pivoted a stop-lever F, which is provided with a retracting-spring $f$, (shown in dotted lines in Fig. 1,) which operates to automatically raise the forward end of the stop-lever F, and on the forward end of the stop-lever F there is a shoulder $f'$, adapted to engage and be normally held in contact with one of the stop-lugs $d'$ $d'$ on the rotary cylinder D by the action of the spring $f$. On the tripping-lever E there is pivoted a tripping-arm G, which extends downward to the stop-lever F, where it is provided with a shoulder $g$, adapted to engage an extension $f^2$ on the lever F, a lateral weight $g'$ on the lever G operating to normally retain the shoulder $g$ thereon in contact with the top of the projection $f^2$ on the lever F, so that when the tripping-lever E is depressed the tripping-arm G operates to depress the stop-lever F and disengage the shoulder $f'$ thereon from the stop-lug $d'$ on the rotary cylinder D, with which it is normally engaged, so as to allow the cylinder D to rotate. When the cylinder D is released and starts to rotate, the cam-surface $d^2$ at the rear of the stop-lug $d'$ at once contacts with the tripping-arm G and instantly moves the shoulder $g$ thereon out of engagement with the projection $f^2$ on the stop-lever F, and the spring $f$ then operates to raise the stop-lever F to its normal position ready to engage the next stop-lug $d'$ on the rotary cylinder D, and as soon as the tripping-lever E moves upward and back again to its normal position the shoulder $g$ on the tripping-arm G again automatically engages the extension $f^2$ on the stop-lever F ready to again operate thereon. When the stop-lever F is depressed, the shoulder $f'$ thereon moves downward toward the inner surface of the flange $d^3$ on the rotary cylinder D and is adapted to engage the inner surface of the flange $d^3$ and also the inwardly-projecting cam-surfaces $d^4$ thereon; but the flange $d^3$ and cams $d^4$ thereon are not material to the successful operation of the tripping and stop mechanism, for the reason that as the cylinder D continues its rotation the stop-lever F, having been released from its contact with the tripping-arm G, is automatically raised by the spring $f$, so as to pass over the cam-surface $d^4$ on said flange $d^3$ and engage the next stop-lug $d'$, the chief function of the flange $d^3$ and cams $d^4$ thereon being to render it impossible to depress the stop-lever F by hand and hold it continuously out of contact with the stop-lugs $d'$, so as to permit the cylinder D to continuously rotate or run away, as in such case the cam-surfaces $d^4$ will automatically raise the stop-lever F into line with one of the stop-lugs $d'$, so that it will contact therewith and stop the cylinder D at each half-revolution thereof.

In operation, a cigar-tip being inserted into the opening $e$ in the tripping-lever E and sufficient pressure applied thereto to depress the tripping-lever E, the tripping-arm G thereon operates to disengage the stop-lever F from the stop-lug $d'$, which allows the rotary cylinder D to rotate until one of the blades $d$ thereon is carried by and in such close proximity to the opening $e$ in the tripping-lever E that it cuts off the cigar-tip projecting through the opening $e$ by means of a shearing cut of the blade $d$ as it passes said opening.

In Figs. 6, 7, 8, 9, and 10 I show a modified construction of this invention in which the rotary cylinder and the blades thereon rotate horizontally instead of vertically, as in the construction hereinbefore described. In the modified construction the frame A' and the spring $B^3$, driving a gear-wheel $B^3$, intermeshing with and driving a pinion C' on the shaft of the rotary cylinder D', are constructed and operate in the usual manner. The rotary cylinder D' is provided on its upper face with horizontal blades $D^2$, which have inclined cutting edges $D^3$. Around the periphery of the upper surface of the cylinder D' there is a flange provided with cam-shaped depressions $d^5$ $d^5$. Directly opposite to the ends of the blades $D^2$ and on the periphery of the cylinder D' there are oval cams $d^6$ $d^6$, and upon the under surface of the periphery of the cylinder D' there are stop-lugs $d^7$ $d^7$. Upon the top of the rear of the frame A' there is pivoted a tripping-lever E', which extends forward over the blades $D^2$ on the cylinder D', where it is provided with a cigar-tip opening $e^5$. The tripping-lever E' is also provided with a retracting-spring $e^3$, (shown in Figs. 6 and 7,) which operates to raise and normally retain the front end of the tripping-lever in a raised position above the blades $D^2$, but permits it to be depressed toward the blades $D^2$ by pressing downward thereon, this downward movement being limited by the contact of the end $e^4$ of the tripping-lever E' with a stop $a'$ on the frame A', and when so depressed the blades $D^2$ on the cylinder D' will pass directly under the cigar-tip opening $e^5$ and cut off a cigar-tip inserted therein, and when the pressure thereon is removed the spring $e^3$ automatically returns the tripping-lever E' to its normal position. At the rear of the frame there is pivoted a vertically-swinging stop-lever G', which is provided with a retracting-spring $g^5$, (shown in Figs. 6 and 7,) which operates to automatically raise the forward end of the stop-lever G'. This stop-lever G' projects forward and is provided with a vertical projection $G^2$, which is adjacent to the periphery of the rotary cylinder D'. On this part $G^2$ of the stop-lever G' there is a shoulder $g^3$, which extends under the cylinder D' and is adapted to engage the stop-lugs $d^7$ thereon, as illustrated in Fig. 10. On the upper end of the part $G^2$ there is an inwardly-projecting lug $g^2$, which extends over the upper edge of the cylinder D', and there is also a shoulder $g^4$ on the upper part of the portion $G^2$ of the stop-lever G'. On the tripping-lever E' there is a downwardly-projecting arm $E^2$, and to this arm there is pivoted a tripping-arm H, provided with a hook $h$. This arm H is preferably provided with a lateral weight H' on its lower end, which operates to retain it in a vertical position, with the hook $h$ thereon normally in engagement with the shoulder $g^4$ on the stop-lever G′, so that when the tripping-lever E′ is depressed the tripping-arm H operates to depress the stop-lever G′ and disengage the shoulder $g^3$ thereon from the stop-lug $d^7$ on the rotary cylinder D′, with which the shoulder $g^3$ on the stop-lever G′ is in normal engagement, so as to allow the cylinder to rotate. When the rotary cylinder D′ is thus released and starts to rotate, the cam $d^6$ on the periphery of the cylinder at once contacts with the tripping-arm H and instantly moves the hook $h$ thereon out of engagement with the shoulder $g^4$ on the stop-lever G′, and the spring $g^5$ then operates to raise the stop-lever G′ to its normal position, ready to engage the next stop-lug $d^7$ on the rotary cylinder D′, and as soon as the tripping-lever E′ moves upward and back again to its normal position the hook $h$ on the tripping-arm H again automatically engages the shoulder $g^4$ on the stop-lever G′ ready to again operate thereon. When this stop-lever G′ is depressed, the lug $g^2$ thereon moves downward into the depression $d^5$ in the rotary cylinder D′, and as said cylinder rotates the stop-lever G′, having been relieved from downward pressure by the disengagement of the hook $h$ from the shoulder $g^4$ thereon, is automatically raised to its normal position by the operation of the spring $g^5$, so that the lug $g^2$ passes up out of the depression $d^5$ and the stop-lever G′ is in position to engage the next stop-lug $d^7$ on the cylinder D′, the chief function of the flange on the upper surface of the cylinder D′ and the depression $d^5$ therein being to render it impossible to depress the stop-lever G′ by hand and hold it continuously out of contact with the stop-lugs $d^6$, so as to permit the cylinder D′ to continuously rotate or run away, as the stop-lever G′ will be forced upward by the flange on the top of the cylinder D′ acting upon the lug $g^2$ on the stop-lever, so as to raise the stop-lever G′ into contact with one of the stop-lugs $d^7$ and stop the cylinder D′ at each half-revolution thereof. In operation this form of construction operates in all respects the same as the construction first hereinbefore described.

It will be observed that in both of these constructions, while the form of the mechanism thereof somewhat differs, yet the principle of both constructions and their operation are the same, as both constructions utilize spring-actuated stop-levers adapted to automatically engage stop-lugs on the rotary cylinder and tripping-levers and tripping-arms pivoted thereto to disengage the stop-levers from the stop-lugs on the cylinders and cams on the cylinders to disengage the tripping-arms from the stop-levers, together with cam-surfaces on the cylinders adapted to engage the stop-levers and insure the stopping of the rotary cylinder at each half-revolution.

Having thus described my invention, so as to enable others to construct and use the same, what I claim as new, and desire to secure by Letters Patent of the United States, is—

1. The combination in a cigar-tip cutter, of a rotary cylinder, stop-lugs thereon, a stop-lever adapted to automatically engage the stop-lugs on said cylinder, a spring for actuating said stop-lever, a tripping-lever, a tripping-arm depending therefrom normally engaging said stop-lever, and cam-surfaces on said rotary cylinder adapted to engage said tripping-arm, substantially as and for the purpose set forth.

2. The combination in a cigar-tip cutter of a spring-driven rotary cylinder, stop-lugs on said cylinder, a stop-lever adapted to automatically engage the stop-lugs on said cylinder, a spring for actuating said stop-lever, a tripping-lever, a tripping-arm pivoted to the tripping-lever and normally in engagement with said stop-lever, and cam-surfaces on said rotary cylinder adapted to engage said tripping-arm and disengage it from said stop-lever, substantially as and for the purpose set forth.

3. The combination in a cigar-tip cutter of a spring-driven rotary cylinder, cutter-blades thereon, stop-lugs on said cylinder, a stop-lever adapted to automatically engage the stop-lugs on said cylinder, a spring for actuating said stop-lever, a tripping-lever having a cigar-tip opening therein, a spring for actuating said tripping-lever, a tripping-arm pivoted to said tripping-lever and in normal engagement with said stop-lever, and cam-surfaces on said rotary cylinder adapted to engage said tripping-arm and disengage it from said stop-lever, substantially as and for the purpose set forth.

4. The combination in a cigar-tip cutter, of a spring-actuated cutter-cylinder, stops and cam-surfaces on said cutter-cylinder, a stop-lever adapted to engage the cam-surfaces and stops on said cutter-cylinder, a spring for actuating said stop-lever, a tripping-lever having an opening therein for the insertion of a cigar-tip, and lever mechanism thereon for engaging and operating said stop-lever, substantially as and for the purpose set forth.

5. The combination with the spring-actuated cutter-cylinder of a cigar-tip cutter, of knives on said cylinder, stop-lugs and cams thereon adapted to engage tripping and stop lever mechanism, and annular cams thereon adapted to throw the stop-lever mechanism into engagement with the stop-lugs on said cylinder, and tripping and stop lever mechanism adapted to engage the stops and cams on said cylinder, substantially as and for the purpose set forth.

6. The combination in a cigar-tip cutter, of a spring-actuated cutter-cylinder, cutter-knives thereon having their cutting edges inclined so as to operate with a shearing cut, stop-lugs and cam-surfaces on said cylinder, a stop-lever adapted to engage said cams and stops, and a tripping-lever having an opening therein for the insertion of a cigar-tip, lever mechanism mounted thereon adapted to engage and release the stop-lever from the stops on the cylinder, and cams on the cylinder adapted to detach the tripping-lever mechanism from the stop-lever mechanism, substantially as and for the purpose set forth.

In witness whereof I affix my signature in the presence of two witnesses.

EDWIN WALKER.

Witnesses:
G. J. MEAD,
H. M. STURGEON.